United States Patent [19]

Gagea

[11] Patent Number: 5,220,179
[45] Date of Patent: Jun. 15, 1993

[54] METHOD OF AND APPARATUS FOR DETECTING THE PRESENCE OF VAPOR AND/OR SMOKE IN THE OUTGOING AIR OF A DEVICE FOR HEATING MATERIALS

[75] Inventor: Leonard Gagea, Judenburg, Austria

[73] Assignee: Helmut Katschnig, Judenburg, Austria

[21] Appl. No.: 770,993

[22] Filed: Oct. 1, 1991

Related U.S. Application Data

[63] Continuation-in-part of Ser. No. 525,243, May 16, 1990, abandoned.

[30] Foreign Application Priority Data

Feb. 6, 1990 [AT] Austria .................... A254/90
Feb. 6, 1991 [EP] European Pat. Off. ......... 890022.6

[51] Int. Cl.$^5$ ............................ G01N 15/06
[52] U.S. Cl. .................. 250/574; 356/438; 250/214 RC
[58] Field of Search ........... 250/574, 575, 576, 564, 250/565, 214 R, 214 C; 356/438, 439, 335-343

[56] References Cited

U.S. PATENT DOCUMENTS 3,901,602  8/1975  Gravatt, Jr. .................. 356/439
4,126,396  11/1978  Hartmann et al. ............. 356/438

*Primary Examiner*—David C. Nelms
*Assistant Examiner*—S. Allen
*Attorney, Agent, or Firm*—Henry M. Feiereisen

[57] ABSTRACT

A method of and apparatus for differentiated measurement of smoke and/or vapor in the outgoing air of a device, especially a microwave unit for disinfection and sterilization of goods includes the steps of deriving a signal commensurate with the presence of vapor in accordance with the intensity increase of refracted and-/or reflected light, and deriving a signal commensurate with the presence of smoke in accordance with the pulsed intensity decrease of light passing through the outgoing air.

12 Claims, 6 Drawing Sheets

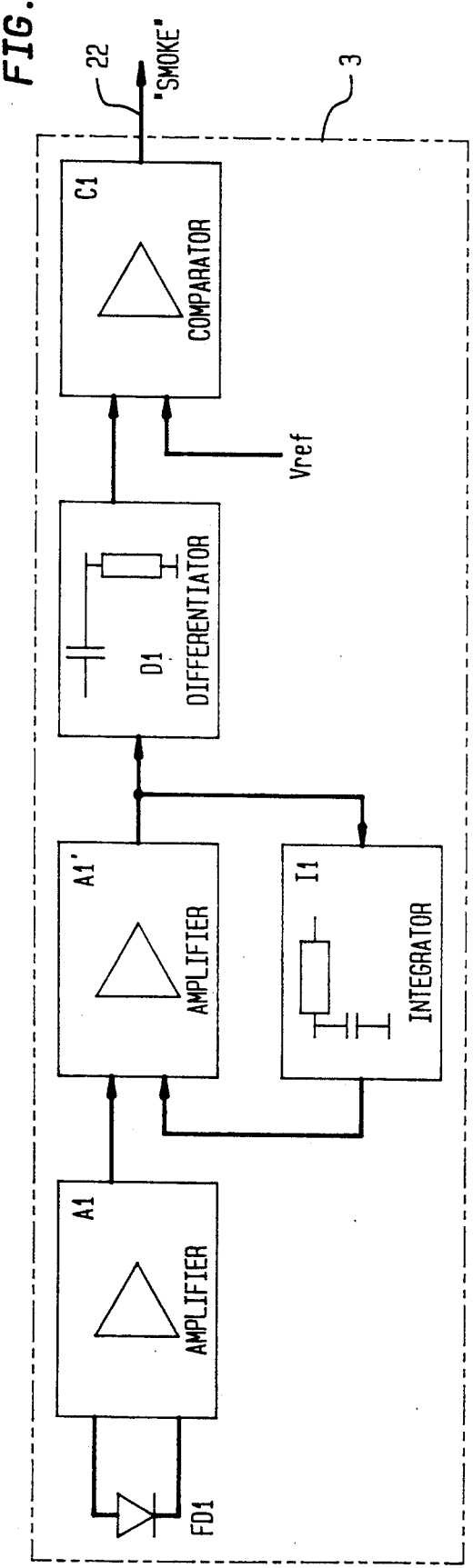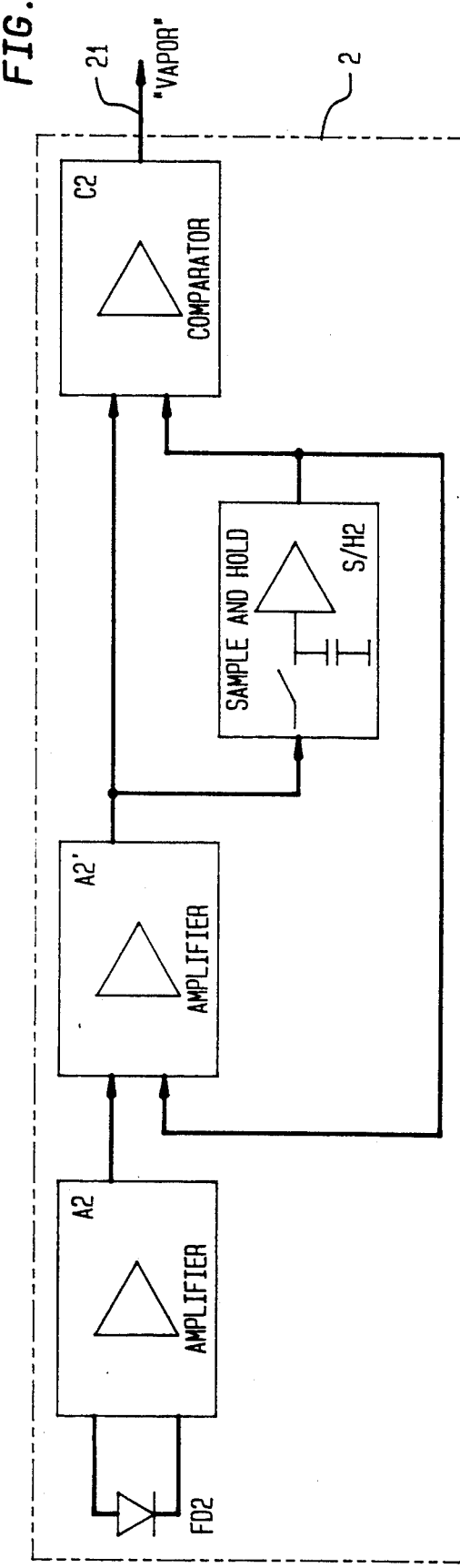

— OUTPUT A2'
△ OUTPUT S/H
○ OUTPUT C2
□ CONTROL SIG. S/H

METHOD OF AND APPARATUS FOR DETECTING THE PRESENCE OF VAPOR AND/OR SMOKE IN THE OUTGOING AIR OF A DEVICE FOR HEATING MATERIALS

CROSS REFERENCE TO RELATED APPLICATIONS

This is a continuation-in-part of application Ser. No. 07/525,243, filed May 16, 1990 now abandoned.

BACKGROUND OF THE INVENTION

The present invention refers to a method of and apparatus for detecting the presence of vapor and/or smoke in the outgoing air of a device for heating materials, especially of a microwave unit for disinfection and sterilization of goods.

A heating of materials, in particular for disinfecting or sterilizing goods, requires a monitoring of the temperature and of the state of aggregation of the material, not only to prevent a drying out and possibly an ignition of the material but also to unequivocally determine the beginning of the actual treatment process such as boiling.

Known smoke detectors operate in various ways, for example by measuring the intensity decrease of a direct optic path. Such devices are, however, incapable of differentiating smoke particles from vapor particles because the receiver detects the radiant intensity irrespective whether the radiant intensity has been diminished by the smoke particles or by the vapor particles.

In particular in connection with appliances such as microwave units for disinfecting and sterilizing goods, it is necessary to register the temperature increase of the goods placed in the radiation chamber in order to avoid a heating above the point of ignition or to recognize an occurring smoldering fire at the earliest time. Also, one should be able to clearly determine the start of the treatment period. Direct measurement of the temperature of the goods to be treated by means of expensive measuring probes becomes even more expensive and complicated in view of the prevailing high frequency field. Thus, hygienic and practical reasons prohibit also a routine monitoring. Thence, a simple measurement of the temperature increase of the goods to be treated can be performed only through indirect means.

It was therefore proposed to install a humidity sensor within the exhaust system of a microwave unit for measuring and registering the humidity content of the outgoing air. Even though this may allow two different measurements, that is on the one hand, the measurement of the intensity decrease of a direct optic radiation and, on the other hand, the indirect measurement of the humidity by means of the humidity sensor within the exhaust system; the use of a humidity sensor is still disadvantageous because the humidity sensor is subjected to wear and easily fails under certain operational conditions so that expensive and cumbersome repair work becomes necessary.

Also, conventional smoke detectors provided within the exhaust system and operating with infrared have a tendency for easy breakdown in view of external conditions, especially when aggressive gases or vapors are contained in the outgoing air of the material which impair or even may destroy the gages. Further, the use of piezoelectric instruments were proposed to measure the degree of moisture of the outgoing air. However, their use is also not possible when being subjected to aggressive mediums.

In general, it should be noted that only those devices are applicable for microwave units which are not influenced or destroyed by a high-frequency field. Apart from conventional detectors having drawbacks as previously set forth, none of the conventional devices are stable within the high-frequency field.

SUMMARY OF THE INVENTION

It is thus an object of the present invention to provide an improved method and improved apparatus for detecting the presence of smoke and/or vapor in the outgoing air of a device, obviating the afore-stated drawbacks.

Another object of the present invention is to provide an improved apparatus for detecting the presence of smoke and/or vapor in the outgoing air of a device, which is free of wear and essentially free of maintenance and applicable in connection with devices operating at high frequency.

These objects and others which will become apparent hereinafter are attained in accordance with the present invention by deriving a signal commensurate with the presence of vapor in accordance with the intensity increase of refracted and/or reflected light and by deriving a signal commensurate with the presence of smoke in accordance with the pulsed intensity decrease of light passing through the outgoing air.

The principle of the present invention is based on the teaching that vapor particles only refract and/or reflect i.e. scatter the emitted light rays while the amorphous and rough structure of smoke particles causes an absorption of the optic light rays and thus only a pulsed intensity decrease of the light passing through the outgoing air. These particular characteristics of vapor and smoke are utilized by the present invention, that is, on the one hand, the fact that vapor only scatters passing light, and, on the other hand, the fact that smoke occurs only in pulsed manner so that the light intensity is decreased in form of impulses upon a presence of smoke. The different behavior of vapor and smoke allows a differentiation and determination as to whether the outgoing air of material to be treated contains smoke and/or vapor.

The scattered light can be measured by a receiver which is disposed at an angle deviating from 180° relative to incident light, with the intensity of the traversing light being simultaneously measured by another receiver which is disposed in the path of the direct optic radiation. In this manner, the differentiation as to whether vapor or smoke is present can be carried out in a very accurate manner because only vapor particles can cause a refraction or reflection of incident light that means intentiy increase while smoke particles cause only a pulsed intensity decrease of the radiation.

Alternatively, the scattered light can be detected together with the light passing through by only one detector which provides a common output signal which is then split for separate processing. It has been found that in particular at low vapor concentration, the repeated reflection of transmitted light causes an increase of the light intensity which can be sensed by the detector while the presence of smoke will cause only a pulsed decrease of the light intensity. Thus, the use of only one detector is possible to accurately detect the presence of smoke and vapor; however, without attaining a quantitative measurement.

The signal commensurate with the pulsed intensity decrease can be differentiated. Suitably, the differentiation may be preceded by an integration for null balancing of a preceding operational amplifier to thereby generate an output signal which is the greater the steeper the impulse. Through integration for null balancing of a preceding operational amplifier, the low frequency signals can be filtered out or isolated. This is done because the output signal from the smoke detector is also influenced by the vapor which causes a slow intensity decrease at high concentration. By providing a feedback with integration, an automatic potential equalization is attained so that the output of the operational amplifier cannot become saturated. Since the increase of light intensity during the vapor measurement progresses slowly and steadily, the signal derived according to the scattered radiation may be compared with a signal generated by a sample and hold circuit in order to allow an evaluation of the measured actual value relative to the preceding value.

Preferably, the intensity of the transmitter may be selected only slightly above the dark current limit of the receiver so that a high sensitivity is attained upon measuring the presence of vapor but still a sufficient response capability is retained in order to detect the pulsed intensity decrease of light during presence of smoke.

It is also possible to relate the measured values commensurate with the scattered radiation with the measured values commensurate with the intensity decrease of the direct radiation, whereby the measured intensity increase of the refracted and/or reflected radiation is utilized for determining the presence of vapor. Thus, the amount of vapor and/or smoke can be separately determined.

In accordance with one embodiment of the present invention, an apparatus for detecting the presence of smoke and/or vapor in the outgoing air of a device, in particular a microwave unit for disinfection and sterilization of goods, includes a light source emitting optic rays, a first receiver oriented in the path of the optic rays and at least one further receiver arranged outside the optic path of the rays for detecting refracted and/or reflected radiation. The provision of such a measuring apparatus allows a simultaneous measurement of vapor particles and smoke particles since the smoke particles only absorb the emitted rays so as to decrease the intensity of the radiation while the vapor particles, due to their surface structure, scatter the emitted rays so that the receiver disposed outside the optic path of the light source will not respond to the presence of smoke particles but only to the presence of vapor.

Suitably, the receiver arranged within the optic path of the light source includes a sensor for registering incident optic rays, at least one operational amplifier connected to the sensor, a differentiator operatively connected to the amplifier for providing an output signal, and a comparator receiving the output signal and comparing the output signal with a reference voltage. In this manner, depending on the steepness of the impulse, a suitable signal is produced for logical processing. Preferably, two amplifiers are provided, with the second amplifier utilizing an integrator for null balance. Through provision of a feedback with integration, pulsed signals are filtered and an automatic potential equalization is attained so that the output of the amplifier does not become saturated i.e. does not overdrive.

The receiver for determination of the presence of vapor includes a sensor for registering refracted and/or reflected rays, at least one operational amplifier connected to the sensor, preferably a second amplifier which is connected to a comparator directly and also via a sample and hold circuit. It will be understood that certainly more than two amplifiers can be employed, with the amplifier being arranged last being connected to the comparator directly as well as also via the sample and hold circuit. The intensity increase during development of vapor is slow and is evaluated by the sample and hold circuit which allows continuous comparison between the actual value and the preceding value, with the comparison being carried out by the comparator. In order to attain an automatic potential equalization, the output of the sample and hold circuit must additionally be connected with the input of the second amplifier for providing the null balance.

According to a further feature of the present invention, the output of the comparator of each receiver is operatively connected to a microprocessor unit which assumes the evaluation of the signals outputted by both comparators.

In accordance with another embodiment of the present invention, an apparatus for detecting the presence of smoke and/or vapor in the outgoing air of a device, in particular a microwave unit for disinfection and sterilization of goods, includes a light source emitting optic rays and only one receiver which is placed in the path of the optic rays emitted from the light source, with a signal splitter being operatively connected to the receiver. Suitably, the output signal of the receiver is amplified before being transmitted to the signal splitter for facilitating the subsequent evaluation. The split signals are then separately fed to a smoke detecting unit and a vapor detecting unit for further processing. Thus, by splitting the signal and separate processing in dependence on the particular characteristics as set forth above, the use of only one receiver is possible.

A smoke detecting unit according to the present invention includes an amplifier following the signal splitter, and a differentiator which is operatively connected to the amplifier. Suitably, the amplifier is provided with an integrator, with a time constant being defined by a RC circuit. The integration ensures an automatic equalization for the slowly fluctuating changes of the amplitude as caused by the presence of vapor. Only pulsed signals can thus pass the combination of amplifier and integrator so that the existence of pulsed signals at the output of the amplifier indicates the presence of smoke particles.

A vapor detecting unit according to the present invention includes a voltage amplifier, a sample and hold circuit and a comparator which is operatively connected to the output of the voltage amplifier as well as to the output of the sample and hold circuit. As set forth above, the increase in light intensity, especially at low concentration, progresses slowly and is evaluated by the sample and hold circuit which allows continuous comparison of the actual value with the preceding value, with the comparison carried out by the comparator. In accordance with the present invention, a d.c. alignment is done after about each 5 seconds so that the increase of the light intensity is detected only within this time period. Suitably, an inverter is operatively connected with the non-inverted input of the voltage amplifier for inverting and feedback of the voltage across the output of the voltage amplifier. In this manner, the voltage across the capacitor of the sample and hold circuit remains constant and is changed only upon change in the received light intensity.

BRIEF DESCRIPTION OF THE DRAWING

The above and other objects, features and advantages of the present invention will now be described in more detail with reference to the accompanying drawing in which:

FIG. 3 is a schematic block diagram of a smoke detecting unit arranged within the optic path of the radiation;

FIG. 4 is a schematic block diagram of a vapor detecting unit arranged outside the optic path of the radiation.

DETAILED DESCRIPTION OF A PREFERRED EMBODIMENT

Figure 1:
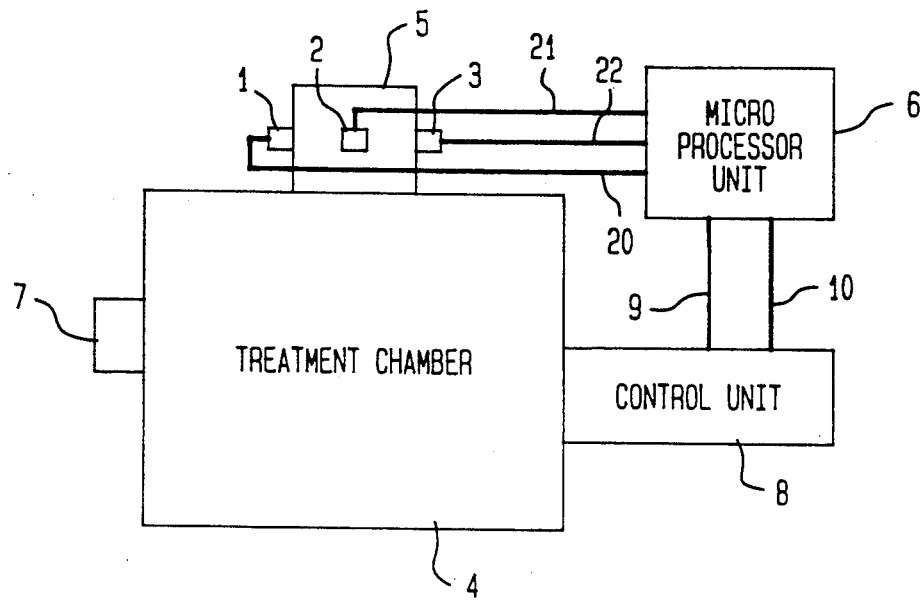
FIG. 1 is a schematic block diagram of one embodiment of an apparatus in accordance with the present invention for determining the smoke and/or vapor presence in the outgoing air of an exemplified microwave unit for disinfecting goods.

Referring now to the drawing, and in particular to FIG. 1, there is shown a schematic block diagram of one embodiment of a measuring apparatus in accordance with the present invention for determining the smoke and/or vapor content in the outgoing air of an exemplified microwave unit for disinfecting goods. The microwave unit includes a treatment chamber 4 in which the goods to be treated are placed and exposed to microwaves generated by one or more magnetrons 7. At the top thereof, the treatment chamber 4 is provided with a cylindrical exhaust pipe 5 for allowing outgoing air to be discharged. An example of a microwave unit of this type is disclosed in the European patent publication EP 0 287 549.

The measuring apparatus for determining the smoke and/or vapor content of the outgoing air is arranged at the exhaust pipe 5 and includes a radiation transmitter or light source 1 for emission of optic rays and two receivers 2, 3 for determining the intensity of incoming rays. The radiation source 1 is in coaxial alignment with the receiver 3 which is thus oriented within the path of rays as emitted from the radiation source 1 while the receiver 2 is disposed outside the path of rays.

Although not shown in the drawing, persons skilled in the art will understand that the light source 1 and the receivers 2, 3 may be provided directly within the treatment chamber 4 as long as the light source 1 and the receivers 2, 3 are positioned in the area of the outgoing air.

Figure 2:
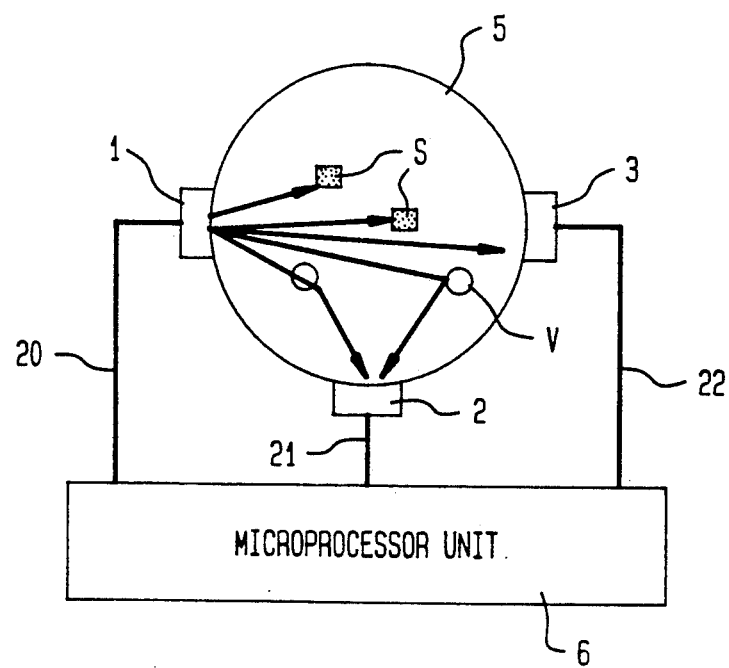
FIG. 2 is a schematic illustration of the apparatus of FIG. 1, showing in detail the path of rays through the outgoing air and an exemplified arrangement of detectors.

As particularly shown in the nonlimiting example of FIG. 2, the radiation source 1 and the receivers 2 and 3 are spaced apart about the circumference of the exhaust pipe 5 in form of an equilateral triangle. The radiation source 1 and the receivers 2, 3 are respectively connected via lines 20, 21, 22 to a microprocessor unit 6 which communicates via lines 9 and 10 with a control unit 8 by which the power output of the magnetron 7 is controlled.

Turning now again to FIG. 2, there is shown a schematic, detailed illustration of the optic path of the rays emitted from radiation source 1, with the smoke particles in the outgoing air being represented by full squares S while the vapor particles are represented by blank circles V. As illustrated in FIG. 2, the smoke particles absorb the rays emitted by the source 1 to thereby decrease the intensity of the signal detected by the receiver 3. The vapor particles, on the other hand, reflect or refract the rays, enabling the suitably positioned receiver 2 to detect the rays.

Persons skilled in the art will understand that the provision of only one receiver 2 is made by way of example only. It is certainly feasible to arrange also more than one such receiver 2 for detecting the reflected and/or refracted rays in order to determine the vapor presence in the outgoing air, with the receivers 2 spaced apart about the circumference of the exhaust pipe outside the direct optic path of the radiation source 1.

Turning now to FIG. 3, there is shown a block diagram of the receiver 3 for detecting the light intensity of incident rays emitted from the radiation source 1. The receiver 3 is composed of various individual parts which are illustrated within a box as indicated in broken lines and includes a photodiode FD1 which is so designed that the rays emitted from the radiation source 1 and falling on it increase the reverse current depending on the intensity of the rays. The signal generated by the photodiode FD1 is processed in a low noise amplifier A1 which maintains zero voltage in the photodiode FD1 so that only the photocurrent is amplified and thermal drift is avoided. Operatively connected subsequently to the amplifier A1 is an amplifier A1', with a portion of the output of the amplifier A1 being fed back via an integrator I1 to the input of the amplifier A1'. Since the output signal of the receiver 3 is also influenced by the vapor, which eventually causes a slow intensity decrease, the feedback with integration by which the pulsed signals are isolated or filtered out results in an automatic potential equalization so that the amplifier A1' does not become saturated i.e. the amplifier A1' cannot overdrive so that a change of the input signal is always reflected in a change of the output signal of the amplifier A1'. The signal delivered by the amplifier A1' is subsequently differentiated in a differentiator D1 such as e.g. a simple RC-circuit which generates an output signal proportional to the rate of change of the input signal.

Each smoke particle influences the light intensity in pulsed manner, with the differentiator D1 separating out these impulses from the total signal i.e. the steeper the impulse the greater the output signal. The output signal generated by the differentiator D1 is compared with a reference voltage $V_{ref}$ in a comparator C1 which supplies a signal via the line 22 to the microprocessor unit 6 for further logical processing.

FIG. 4 is a block diagram of the receiver 2 for detecting incident rays reflected or refracted by the vapor particles V and for determining the vapor presence in the outgoing air. The receiver 2 is composed of various individual parts which are also illustrated within a box as indicated in broken lines and includes a photodiode FD2 which receives the rays deflected by the vapor particles V and generates a signal which is supplied to a subsequent amplifier A2. It will be readily recognized that in the event the outgoing air does not contain vapor, the photodiode FD2 will register no radiation or at most very low radiation which is reflected by the wall surface of the exhaust pipe 5. An increased vapor presence leads to an increased reflection of rays and thus to a higher-level signal which is supplied to the amplifier A2. The signal inputted into the amplifier A2 is boosted and fed to a further amplifier A2'. The output of the amplifier A2', is operatively connected with a comparator C2 and with the input of a sample and hold circuit S/H2. The output of the sample and hold circuit S/H2 is operatively connected to the comparator C2. In addition, a portion of the output signal from the sample and hold circuit S/H2 is also fed back to the amplifier A2'. At vapor measurement, the increase of radiation intensity as registered by the receiver 2 occurs very slowly and is evaluated by the sample and hold circuit S/H2 (sample period is in the range of seconds) through continuous comparison between the actual value and the preceding value which comparison is carried out by the comparator C2. The feedback to the amplifier A2' leads to an automatic potential equilibration. The signal outputted by the comparator C2 is fed to the microprocessor unit 6 via line 21 for logical processing and eventual control of the power output of the magnetron 7 of the microwave unit by the control unit 8.

Figure 5:
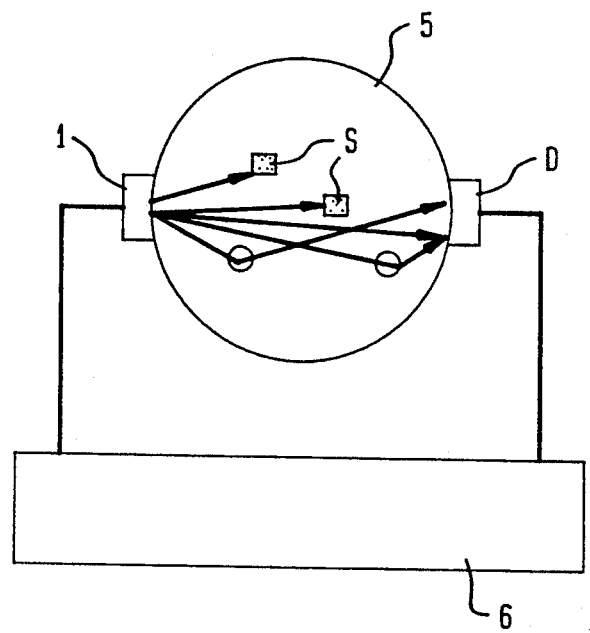
FIG. 5 is a schematic illustration of another embodiment of an apparatus in accordance with the present invention for detecting the smoke and/or vapor presence in the outgoing air of an exemplified microwave unit for disinfecting goods, showing the path of rays through the outgoing air, with the apparatus including only one detector.
Figure 6:
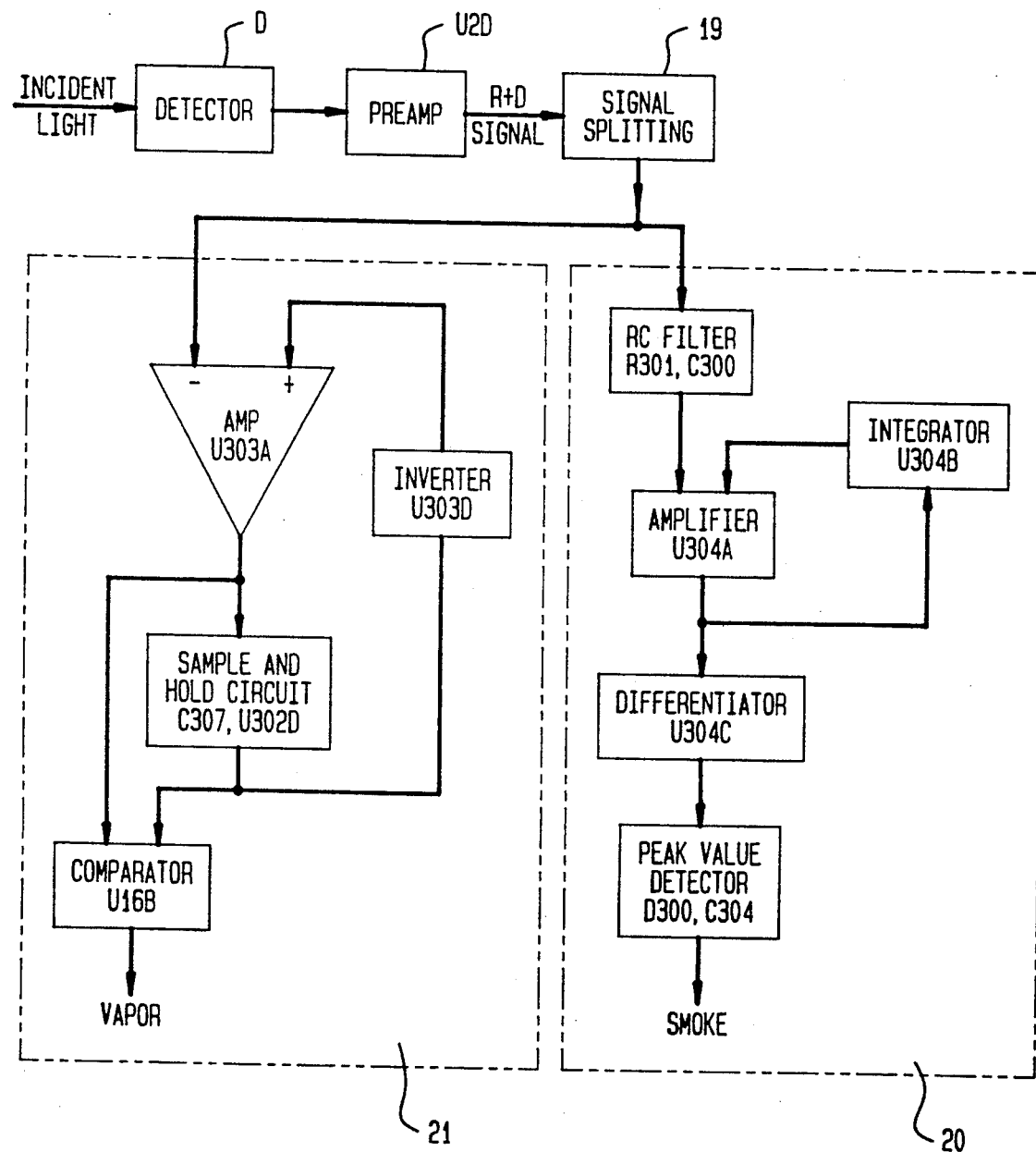
FIG. 6 is a schematic block diagram of the combined smoke and vapor detector in accordance with FIG. 5.
Figure 7:
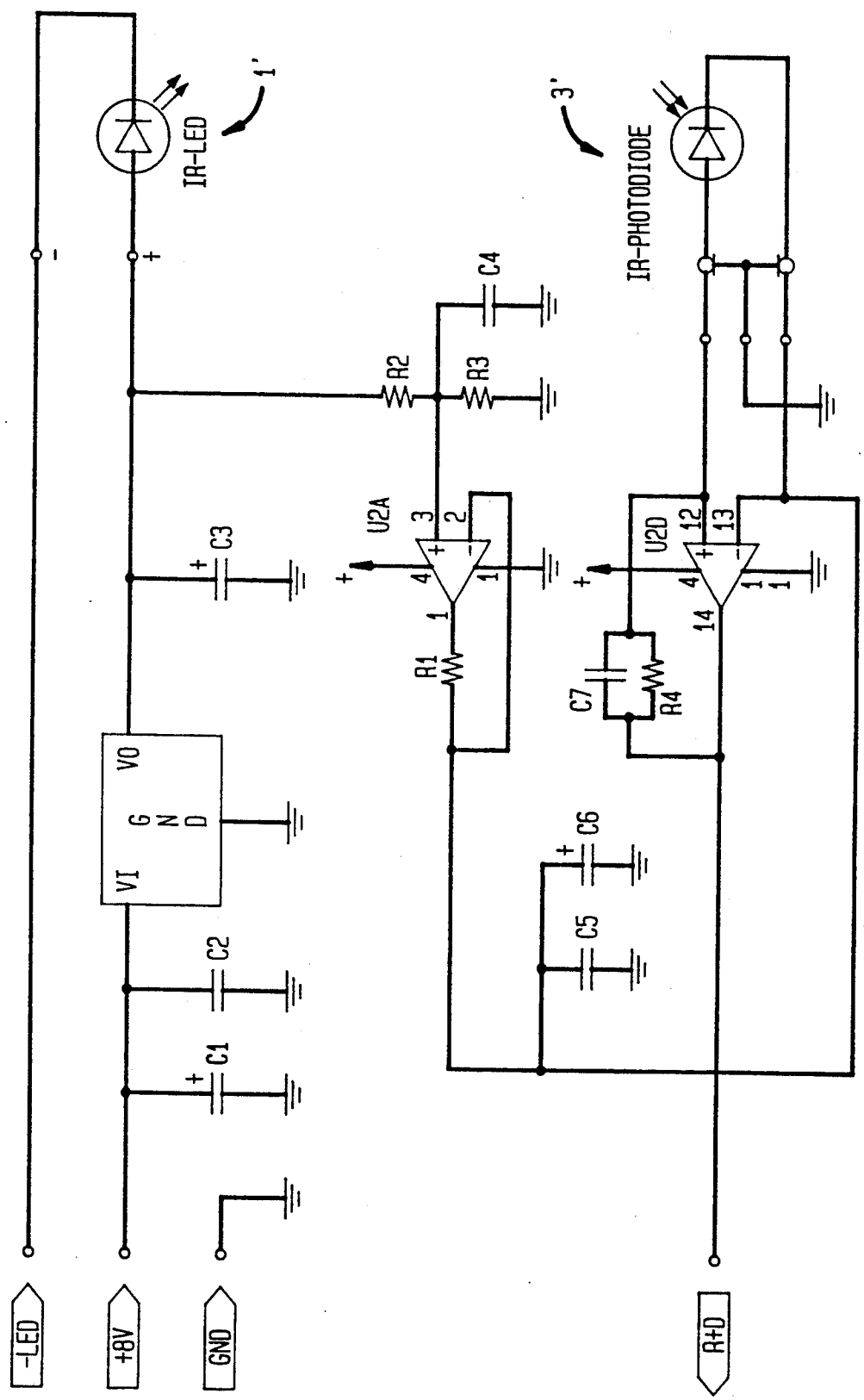
FIG. 7 is an electric circuit diagram of the detector according to FIG. 5, in combination with a preamplifier for generating an output signal commensurate with the presence of smoke and/or vapor.

Turning now to FIGS. 5 and 6, there are shown schematic block diagrams of another embodiment of an apparatus in accordance with the present invention for detecting the smoke and/or vapor presence in the outgoing air of an exemplified microwave unit for disinfecting goods. The apparatus according to FIG. 5 differs from the embodiment of FIG. 1 in that only one detector D is employed for detecting the presence of vapor and/or smoke, with the detector D being disposed in the direct optical radiation emitted from the radiation source 1. The detector D provides a signal which is commensurate with incident light and which is split after being amplified by a pre-amplifier U2D. The other parts in FIG. 7 are used for power supply regulation and DC operating point of U2D. The split signals are then respectively supplied to an analog-digital microcontroller module which is illustrated in detail in FIG. 8 and comprises a smoke detecting unit 20 and a vapor detecting unit 21 by which the incoming signal is differentiated so as to allow detection of smoke presence and/or vapor presence.

As shown in the overall illustration of FIG. 6, the smoke detecting unit 20 includes an operational amplifier U304A by which the incoming signal is amplified after removing interfering signals in a preceding RC filter (low-pass filter) R301, C300. The amplifier U304A has as feedback an integrator U304B, with the integration serving as automatic equalizer for the slowly fluctuating amplitude changes which may arise by the presence of vapor. The provision of the amplifier U304A and the integrator U304B permits only pulsed signals commensurate with the presence of smoke to pass therethrough while the presence of vapor is prevented from influencing the signal to be processed. Operatively connected to the amplifier U304A is a differentiator U304C whose output signal is proportional to the input pulsed signal and inputted to a peak value detector with a diode D300 and capacitor C304. A voltage across the capacitor C304 provides a direct information about the presence of pulsed signals at the output of the pre-amplifier U2D and thus about the presence of smoke particles.

The vapor detector unit 21 includes a voltage amplifier U303A which is part of a four-way operational amplifier further including elements U303B, U303C, U303D (FIG. 8) as will be described hereinafter. The voltage amplifier U303A is supplied with a signal from signal splitter 19 and is followed by a sample-hold-circuit which includes a capacitor C307 and an analog switch U302D. By means of the capacitor C307, the output signal from the voltage amplifier U303A is stored over a time interval of a few seconds. The output of the voltage amplifier U303A and of the sample-hold-circuit is connected to a comparator U16B. As outlined in connection with the first embodiment with reference to the description of FIG. 4, the intensity increase of radiation during the development of vapor is slow and is evaluated by the sample-hold-circuit which allows continuous comparison between actual and previous values, with the comparison carried out by the comparator U16B. Suitably the non-inverted input of the voltage amplifier U303A is operatively connected to an inverter U303D by which the voltage at the output of the voltage amplifier U303A is inverted and fed back. Thus, the voltage across the sample-hold-circuit remains constant and is only changed when the radiation intensity changes.

Figure 8:
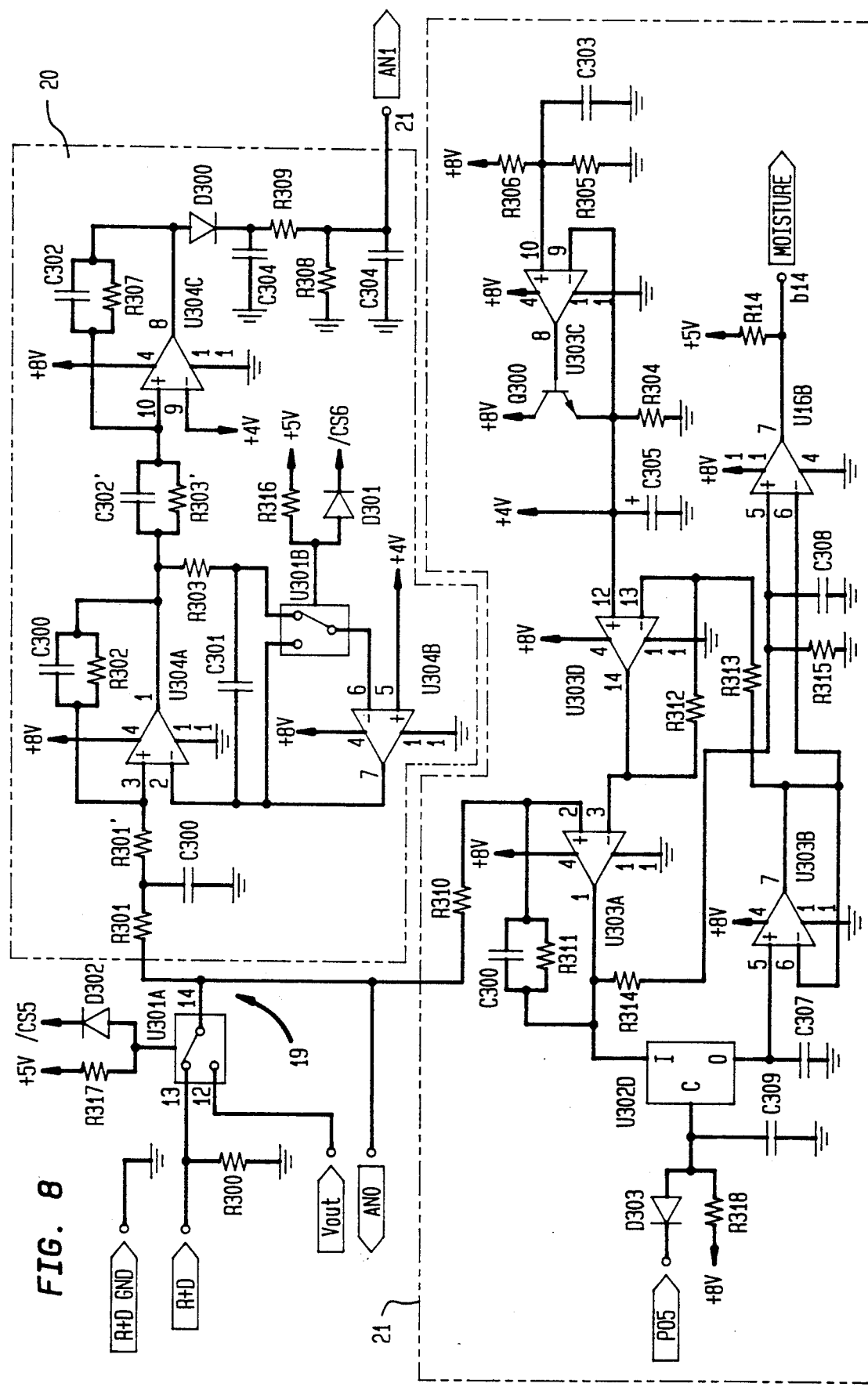
FIG. 8 is an electric circuit diagram of the detector according to FIG. 5, showing in detail an analog-digital unit for further processing the generated output signal so as to allow diffcrentiation between the presence of smoke and the presence of vapor.

Turning now to FIGS. 7 and 8, there are shown detailed circuit diagrams of the apparatus according to FIG. 5 for generating an output signal commensurate with the presence of smoke and/or vapor and for further processing the output signal.

The detector D includes an infrared light-emitting diode (infrared emitter) 1' and an infrared photodiode 3'. The measuring principle rests upon the measurement of light intensity, with the photocurrent in the infrared emitter 1' and infrared photodiode 3' being controlled such that the photocurrent is slightly above the dark current of the photodiode 3'.

Operatively connected to the photodiode 3' is the operational pre-amplifier U2D with CMOS-technology by which the very small photocurrent is boosted. The circuit represents a so-called voltage/current converter, with the operating point (d.c. voltage) being kept constant at a predetermined level by a second operational amplifier which is designated by reference numeral U2A. The predetermined level is given by impedances R2 and R3.

The pre-amplifier U2D thus provides as output signal R+D a voltage signal which is easily changed by the presence of smoke and/or vapor in the measuring channel. At vapor-free and smoke-free conditions, the voltage level is determined by the light intensity of the infrared emitter 1'.

The infrared emitter 1' and the infrared photodiode 3 together with the pre-amplifier represent a transmitter/receiver module which is part of the overall detecting or evaluation unit. The other part is the analog-digital microcontroller module which carries out the actual evaluation of the signals as provided by the transceiver module as will now be described in detail.

Persons skilled in the art will understand that the transmitter/receiver module contains further structural elements which are required for the overall operation and which are illustrated in FIG. 7. However, a detailed description of these further elements has been omitted for sake of simplicity.

As previously set forth, the analog-digital module includes the vapor detecting unit 21 and the smoke detecting unit 20. The signal outputted from the pre-amplifier U2D is split at 19, with one part being transmitted to the vapor detecting unit 21 and one part being transmitted to the smoke detecting unit 20. The partial signal for the vapor detector unit 21 is fed to the input of the voltage amplifier U303A, with the output signal thereof being stored by the capacitor C307 in a time interval of few seconds (sample and hold circuit). The voltage fed to the capacitor C307 is read at U303B and inverted and fed back via the inverter U303D to the non-inverted input of amplifier U303A. Thus, the voltage across capacitor C307 is always the predetermined sample value, that is about +4 V which is supplied by the elements U303 (four-way operational amplifier) and Q300. When vapor develops and causes a change of the received light intensity, the voltages across capacitor C307 and across at the output of amplifier U303A diverge between two sample intervals. This difference is interpreted by the comparator U16B. The switching point of the comparator U16B, i.e. the point at which the difference indicates the presence of vapor, is determined by the voltage divider R314, R315. Thus, a voltage across the output of comparator U16B indicates the presence of vapor.

As already set forth, the sensitivity is determined by the time ratio of the sample and hold circuit and by the voltage divider R314, R315. When the analog switch U302D is closed, a negative feedback is obtained via U303B and U303D so that the voltage across the capacitor C307 is about 4.7 V due to the 4 V level at the positive input of inverter U303D. On the other hand, when the analog switch U302D opens, the feedback is interrupted so that a fixed voltage, which is stored across capacitor C 307, and a variable voltage at the output of voltage amplifier U303A can be compared by the comparator U16B. If an increase of light intensity occurs within this period (about 5 seconds), the voltage at amplifier U303A increases, with the voltage divider R314, R315 determining the limit by which the vapor signal is activated.

Further, it will be appreciated that the intensity of the infrared transmitter plays also a certain role. A too high infrared radiation causes the receiver to be too insensitive to detect low reflective light emissions so that a voltage rise already caused by a slight presence of vapor will not be detected. In this case, the apparatus is insensitive for beginning vapor presence. On the other hand, a too small infrared radiation does not provide a reserve for the smoke detection because smallest deviations of the light intensity will result in that no changes of the light intensity can be perceived. This means that pulsed decreases of light intensity caused by pulsed passing trails of smoke cannot be perceived.

Turning now to the smoke detecting unit 20, the other partial signal as generated by the signal splitter at 19 is further processed by feeding it through a RC-filter R301, C300 (low-pass filter) for suppressing interfering signals. The thus screened signal is fed to the amplifier U304A, with its amplifying factor being determined by the resistors R302 and R301'. The operational amplifier U304A has as feedback an integrator U304B, with the time constant being defined by the RC circuit R303, C301. The integration at the negative feedback serves as automatic equalizer for slowly changing fluctuations of the amplitude as caused by the presence of vapor Therefore, a differentiation between pulsed changes through smoke and slow changes through vapor is feasible. The combination of the amplifier U304A and integrator U304B allows a passage of only pulsed signals.

Following the combination of the amplifier U304A and integrator U304B is a differentiator U304C which has a time constant defined by the RC circuit R307, C302' and is operatively connected to a peak-value detector with diode D300 and a capacitor C304. The voltage across the capacitor C304 is thus a direct information about the existence of pulsed signals at the output of pre-amplifier U2D, thus indicating the presence of smoke particles.

Persons skilled in the art will understand that FIG. 8 discloses a complete printed circuit board and thus contains more components which, though required for the overall operation are of less significance with regard to the invention and thus are not described in detail. For example, the smoke detecting unit 20 includes an analog switch U301A at the input prior to the signal splitter 19 for allowing a self test of the electronic. A microprocessor switches the input to the signal of $V_{out}$ where a digital-to-analog converter provides a direct voltage. Thus, the operability of the board can be checked without the transmitter/receiver part. Switch U301B is also employed during the self test. The position of the switch U301B as shown in FIG. 8 is for normal operation. Regarding the vapor detecting unit 21, the element U303C, which is part of the four-way operational amplifier, is a component of a circuit section supplying a reference voltage of e.g. 4 V. The alignment is attained around this voltage. Persons skilled in the art will recognized that it is certainly possible to utilize the 0 V potential instead of 4 V by using a +/− supply voltage.

Figure 9:
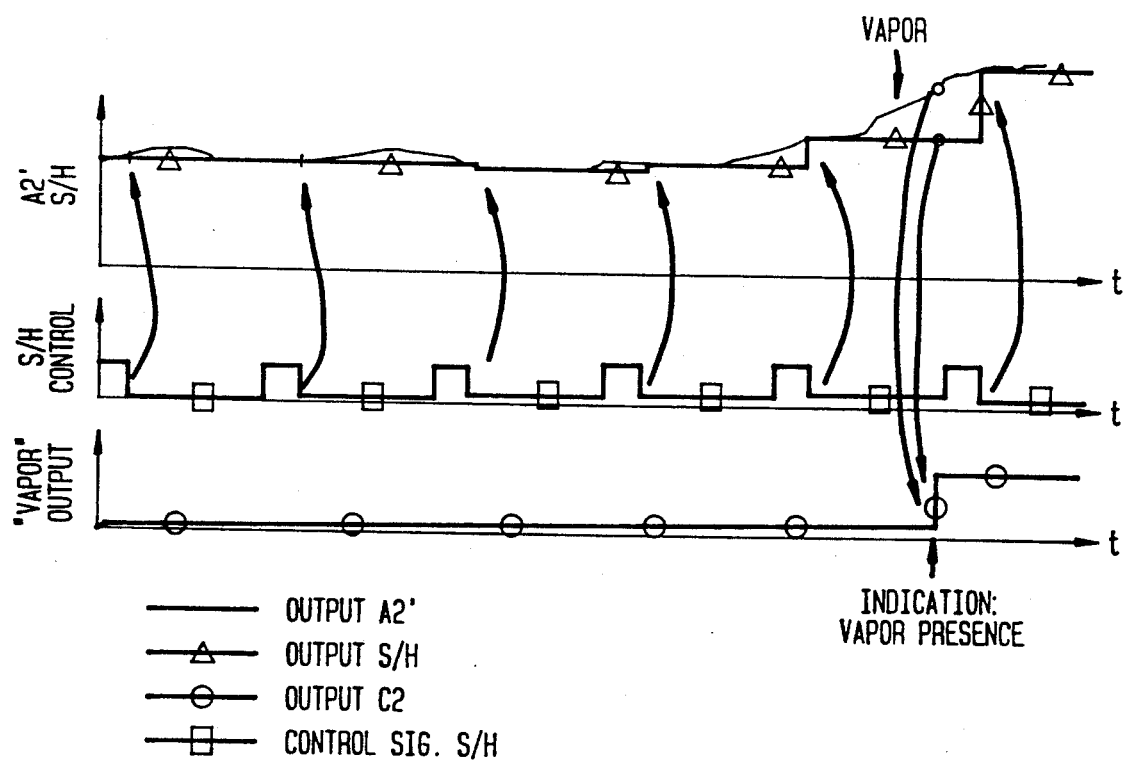
FIG. 9 is a schematic graphical illustration of the relationship between signals commensurate with vapor and obtained at individual outputs.

Turning now to FIG. 9, there is shown a diagrammatic illustration of individual switching stages. The continuous line represents the signal outputted from amplifier A2' according to FIG. 4 and from amplifier U303A according to FIG. 6. The triangles represent the signal fed from the sample and hold circuit to the comparator U16B. The squares represent the signal reflecting the time impulses of the sample and hold circuit and thus the comparative moments between the sample and hold circuit and the value measured at the output of the amplifier U303A.

As can be seen from FIG. 9, the sample and hold increases depending on the course of the signal at the output of amplifier A2' or amplifier U303A, with the individual adjustments of the sample and hold being dependent on the increase of the actual signal change. When the switching stage in the sample and hold exceeds a given threshold value, the comparator responds and indicates a presence of vapor. The values measured at the output of the comparator are designated by circles in FIG. 9, with the switching stage being indicated as single stage when encountering a higher difference between the last sample and hold value and the measured value at the output of amplifier A2' or amplifier U303A. This single stage is then responsible for the switch over of the indicating unit for displaying the presence of vapor.

In order to synchronize the circuits, adjustments would have to be made at each measuring point. Thus, an automatic adjustment is advantageous, with the entire analog circuit being monitored by a microcontroller. Through precise measurement (microcontroller with integrated analog-digital converter) of voltages AN0 and AN1 (see FIG. 8) and through use of suitable software, a self-calibration is feasible.

While the invention has been illustrated and described as embodied in a method of and apparatus for detecting the presence of vapor and/or smoke in the outgoing air of a device for heating materials, it is not intended to be limited to the details shown since various modifications and structural changes may be made without departing in any way from the spirit of the present invention.

What is claimed as new and desired to be protected by Letters Patent is set forth in the appended claims:

I claim:

1. A method for detecting the presence of smoke and/or vapor in the outgoing air of a device, comprising the steps of:
    arranging a receiver in the path of an optic radiation from a radiation source for detecting incident light and providing an output signal;
    splitting the output signal;
    transmitting one part of the output signal to a vapor detecting unit for deriving a signal commensurate with the presence of vapor in accordance with a slow intensity increase of refracted and/or reflected light as caused by vapor; and
    transmitting another part of the output signal to a smoke detecting unit for deriving a signal commensurate with the presence fo smoke in accordance with a pulsed intensity decrease of light passing through the outgoing air.

2. A method as defined in claim 1 wherein said second transmitting step includes the step of differentiating the signal of the pulsed intensity decrease.

3. A method as defined in claim 2 wherein said second transmitting step further includes the step of null balancing an operational amplifier through integration prior to said differentiating step.

4. A method as defined in claim 1 wherein said first transmitting step includes the step of comparing the signal obtained in accordance with the intensity of refracted and/or reflected radiation with a signal generated by a sample and hold circuit.

5. A method as defined in claim 1, and further comprising the step of using a detector with a transmitter having an intensity slightly exceeding the dark current limit of its receiver.

6. A method as defined in claim 1, and further comprising the step of relating the signal of the first transmitting step with the signal of the second transmitting step, with the intensity increase as determined by said first transmitting step being utilized for determining the presence of vapor in the outgoing air.

7. Apparatus for detecting the presence of smoke and/or vapor in the outgoing air of a device; comprising:
    a source emitting optic radiation;
    a receiver disposed in the path of said optic radiation for providing a signal commensurate with the presence of vapor and/or smoke;
    operatively connected to said receiver for splitting the signal transmitted from said receiver to provide a first signal and a second signal;
    smoke detecting means operatively connected to said signal splitter for receiving said first signal; and
    vapor detecting means operatively connected to said signal splitter for receiving said second signal.

8. Apparatus as defined in claim 7, and further comprising a pre-amplifier provided between said receiver and said signal splitter for boosting the output signal from said receiver.

9. Apparatus as defined in claim 7 wherein said smoke detecting means includes an amplifier following said signal splitter, and a differentiator operatively connected to said amplifier.

10. Apparatus as defined in claim 9 wherein said amplifier includes as feedback an integrator which has a time constant defined by a RC circuit.

11. Apparatus as defined in claim 7 wherein said vapor detecting means includes a voltage amplifier following said signal splitter and having an output, a sample and hold circuit having an output, and a comparator, said output of said voltage amplifier and said output of said sample and hold circuit being connected to said comparator.

12. Apparatus as defined in claim 11 wherein said voltage amplifier has a non-inverting input, and further comprising an inverter connected to said non-inverting input of said voltage amplifier for inverting and feedback of the voltage across the output of the voltage amplifier.

* * * * *

UNITED STATES PATENT AND TRADEMARK OFFICE
CERTIFICATE OF CORRECTION

PATENT NO. : 5,220,179
DATED : June 15, 1993
INVENTOR(S) : Leonard Gagea

It is certified that error appears in the above-identified patent and that said Letters Patent is hereby corrected as shown below:

Column 2, line 55, change "intentiy" to -- intensity --.

Column 6, line 53, change "amplifier A1' is an amplifier A1'" to -- amplifier A1 is an amplifier A1' --.

Column 9, line 3, change "photodiode 3" to -- photodiode 3' --.

Claim 7, column 12, line 21, add -- a signal splitter -- before "operatively connected".

Signed and Sealed this

Fifteenth Day of March, 1994

Attest:

BRUCE LEHMAN

Attesting Officer

Commissioner of Patents and Trademarks